United States Patent [19]

Boyce et al.

[11] 4,284,542

[45] Aug. 18, 1981

[54] HOT MELT ADHESIVE COMPOSITION

[75] Inventors: Richard J. Boyce, Glen Farms, Md.; Terence A. Cooper, Newark, Del.

[73] Assignee: E. I. Du Pont de Nemours and Company, Wilmington, Del.

[21] Appl. No.: 132,499

[22] Filed: Apr. 7, 1980

Related U.S. Application Data

[63] Continuation-in-part of Ser. No. 36,539, May 7, 1979, abandoned.

[51] Int. Cl.$^3$ .............................................. C08L 93/00
[52] U.S. Cl. .............................. 260/27 R; 260/31.8 M; 260/31.8 XA; 260/31.8 PQ; 260/30.6 R; 260/42; 260/42.56; 260/42.45; 260/42.46; 260/45.9 NP; 260/42.44; 525/2; 525/176; 525/206; 525/221

[58] Field of Search ............... 260/45.9 NP, 27 R, 42, 260/42.56, 42.44, 42.45, 42.46, 31.8 M, 31.8 XA, 31.8 PQ, 30.6 R; 525/2, 176, 206, 221

[56] References Cited

U.S. PATENT DOCUMENTS

| | | | |
|---|---|---|---|
| 3,404,134 | 10/1968 | Rees | 260/95 R |
| 3,562,197 | 2/1971 | Sears et al. | 260/29.6 MP |
| 3,573,240 | 3/1971 | Flanagan | 260/28.5 A |
| 3,658,579 | 4/1972 | Ottinger et al. | 260/45.9 NP |
| 3,904,588 | 9/1975 | Greene | 260/78.5 R |
| 4,031,058 | 6/1977 | Cella, Jr. | 260/33.8 UA |

*Primary Examiner*—Melvyn I. Marquis

[57] ABSTRACT

Hot melt adhesive and sealant compositions based on alkali metal ionomers of random copolymers of ethylene, methyl acrylate, and one or more carboxylated monomers have improved high temperature viscosity stability when the composition contains 0.05–10 phr of ammonium polyphosphate.

9 Claims, No Drawings

HOT MELT ADHESIVE COMPOSITION

CROSS REFERENCE TO RELATED APPLICATION

This application is a continuation-in-part of copending U.S. Patent Application Ser. No. 036,539, filed May 7, 1979 and now abandoned.

DESCRIPTION

1. Technical Field

This invention relates to hot melt adhesive and sealant compositions which can be used, for example, as sealants for double glazing units to be used as windows, as adhesives for automobile windows, as architectural glass sealants, as sealants in solar collectors, as load bearing sealants in automotive, appliance, or aerospace applications, or as jet apron sealants. In particular, this invention relates to such adhesive and sealant compositions which are based on alkali metal ionomers of random copolymers prepared from ethylene, methyl acrylate, and at least one carboxylated unsaturated monomer, and the improvement of viscosity stability of such compositions, particularly when such compositions are subjected to high temperature, such as just prior to and during application of the adhesive.

2. Background Art

U.S. Pat. No. 4,031,058, granted June 21, 1977 to Cella, discloses certain hot melt adhesive and sealant compositions based on sodium or potassium ionomers of random ethylene/methyl acrylate/monoethyl maleate terpolymers. The compositions of Cella are representative of compositions improved by the present invention. Similar compositions can be prepared from related terpolymers wherein the monoethyl maleate is replaced by other carboxylated monomers such as acrylic acid, methacrylic acid and maleic acid.

DISCLOSURE OF THE INVENTION

The present invention relates to hot melt adhesive and sealant compositions which are based on alkali metal ionomers of random copolymers of ethylene, methyl acrylate and at least one carboxylated monomer, to the improvement of the viscosity stability of such compositions, particularly at high temperature, by including in such compositions 0.05–10 (preferably 0.1–10) parts/100 parts of copolymer of ammonium polyphosphate, and to masterbatch compositions useful in the preparation of such improved adhesive and sealant compositions. In addition to the improved viscosity stability, such adhesive and sealant compositions offer the following noteworthy characteristics:

1. High mechanical strength and dead load creep resistance extending up to 100° C. while still allowing pumping at 150°–200° C.
2. Low temperature flexibility down to −60° C.
3. Outstanding oil and jet fuel resistance.
4. Excellent weathering and ultra-violet resistance.
5. Good adhesion to many substrates, including glass and metals, without priming.

As described in greater detail in U.S. Pat. No. 4,031,058, one type of random copolymer which can be improved by the present invention contains about 50 to 60 wt. % polymerized methyl acrylate units, about 3 to 5 wt. % polymerized maleic acid monoethyl ester (monoethyl maleate) units and about 35 to 47 wt. % polymerized units of ethylene. Suitable copolymers may contain other carboxylated unsaturated termonomers in place of the monoethyl maleate, and may also contain minor amounts of other polymeric units such as those listed in U.S. Pat. No. 3,264,272, granted Aug. 2, 1966 to Rees. Useful carboxylated unsaturated termonomers include those represented by the general formula

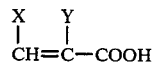

where X is H—, —COOH or —COOR,
where R is $C_1$ to $C_6$ alkyl
and where Y is H or $CH_3$—.

Preferred termonomers are monoethyl maleate, acrylic acid and maleic acid. Between about 5% and about 60% of the carboxylic acid groups in the copolymer are neutralized with an alkali metal, preferably sodium and/or potassium ions. Processes for the neutralization of acid groups in random ethylene copolymers are taught in U.S. Pat. No. 3,404,134, granted Oct. 1, 1968 to Rees. Preferably, the copolymer prior to neutralization has a molecular weight such that the melt index of the copolymer is within the range of about 1 to 30 g per 10 minutes, ASTM D 1238, 190° C., 2160 g weight.

The adhesive and sealant compositions of the present invention will generally contain, in addition to the terpolymer ionomer and the ammonium polyphosphate, one or more of the following: tackifying resin, plasticizer and filler. The masterbatch compositions of the present invention will contain the terpolymer ionomer, the ammonium polyphosphate, and at least one, but generally not all, of the additives described hereinafter. Preferably, the masterbatch compositions contain only the terpolymer ionomer, the ammonium polyphosphate, and an inorganic filler, generally carbon black. The base terpolymer ionomer is difficult to isolate in the raw state, and carbon black provides an unusually strong reinforcing interaction with the ionic groupings, which greatly enhances sealant strength. In preparing the novel adhesive and sealant compositions of this invention, one can also use a conventional masterbatch free of ammonium polyphosphate and add the polyphosphate during adhesive or sealant preparation.

It should be noted that during preparation of the masterbatch, temperature control is important to provide efficient mixing while avoiding thermal degradation of the polymer. A preferred procedure comprises mixing the masterbatch materials in an internal mixer at 70°–205° C., preferably 80°–160° C., and extruding the resulting blend at 100°–205° C., preferably 130°–195° C. If temperatures in excess of those specified are used, the resulting masterbatch will produce hot melt sealants which have a tendency to increase in viscosity, particularly in the absence of ammonium polyphosphate, or even undergo gelation. While this undesirable instability can be substantially overcome or even eliminated by the presence of ammonium polyphosphate, it is still recommended that masterbatch preparation be performed within the suggested temperature ranges. It should be further noted that during preparation of the masterbatch from the terpolymer, interaction of the terpolymer with the basic alkali metal compound to form the ionomer should be substantially completed before the ammonium polyphosphate is added. The amount of ammonium polyphosphate use is relatively small; thus it may be convenient to add it in the form of a blend with a minor portion of the carbon black and/or a minor portion of the random copolymer.

Tackifiers suitable for use in the compositions of the present invention include commercially available resins such as (a) "Picco" 6110 resin sold by Hercules Incorporated, which is a highly aromatic hydrocarbon resin, petroleum based, with a softening point, R and B, of 108°–112° C. and a density at 200° C. of 1060 kg/m$^3$;

(b) "Picco" 6140 resin sold by Hercules Incorporated, which is a highly aromatic hydrocarbon resin, petroleum based, with a softening point, R and B, of 140°–144° C. and a density at 25° C. of 1070 kg/m$^3$;

(c) "Piccovar" AP-10 sold by Hercules Incorporated, which is an alkyl-aromatic product that is soluble in aliphatic hydrocarbons, with a color range on the coal tar scale of 4–6, a softening point of 10° C., a maximum acid number of 1, a maximum saponification number of 1, a specific gravity of 0.93 and a melt viscosity of 0.1 Pa.s at 85° C., 1.0 Pa.s at 63° C. and 10 Pa.s at 40° C.; and (d) "Piccoumaron" 10 sold by Hercules Incorporated, which is a polyindene type polymer with a color range on the coal tar scale of 3–5, a softening point of 10° C., a maximum acid number of 1, a maximum saponification number of 1, a specific gravity of 1.04, and a melt viscosity of 0.1 Pa.s at 95° C., 1.0 Pa.s at 55° C., and 10 Pa.s at 40° C.

Other tackifying resins can also be used, see, e.g., U.S. Pat. No. 3,573,240, issued Mar. 30, 1971 to Flanagan. The amount of tackifying resin in the hot melt adhesive of the present invention is between about 0 parts by wt. to about 250 parts by wt. per 100 parts by wt. of the random copolymer of ethylene, methyl acrylate and at least one carboxylated unsaturated monomer. Mixtures of tackifiers can also be used.

Selection of tackifiers, as well as selection of the other compounding additives, is dictated by compatibility as well as by the properties desired in the sealant. Tackifying resins are considered incompatible either if they are difficult to incorporate into the rubber or if phase separation ("blooming") occurs on standing. Compatibility can be readily determined using a pressed slab of 50/50 tackifier/masterbatch composition. Most common types of tackifier are compatible, but the results summarized in Table 1 below will offer an additional guidance.

TABLE 1

| Trade Name | Chemical Name | Compatibility |
|---|---|---|
| Amberol ST-140F | Phenolic | C |
| Arizona DR-22 | Disproportionated Tall Oil Rosin | C |
| Blackhawk 500 | Aromatic | C |
| Copar | Hydrocarbon | C |
| Crosdim | Rosin Dimer | C |
| Cumar P-10 | Coumarone-Indene | C |
| Dymerex | Polymerized Rosin | C |
| Dymerex A-700 | Polymerized Rosin | C |
| *Foral 85 | Glycerine Ester of Hydrogenated Rosin | C |
| *Foral 105 | Pentaerythritol Ester of Hydrogenated Rosin | C |
| Kristalex 1120 | α-Methyl Styrene Polymer | C |
| Krumbhaar 1717B | Ketone Based Saturated Resin | C |
| *Lawter K-1979 | Polyester | C |
| *Mohawk MR-85 | Polyketone | C |
| Nevillac Soft | Alkyl Hydroxy | I |
| Nirez 1010 | Polyterpene | I |
| Nirez V2150 | Terpene Phenolic | C |

TABLE 1-continued

| Trade Name | Chemical Name | Compatibility |
|---|---|---|
| Pentalyn 344 | Pentaerythritol Ester of Stabilized Resin Acids | C |
| Petrorez 140 and 145 | Aromatic | C |
| Picco 6070 | Highly Aromatic Hydrocarbon | C |
| Picco 6100 | Highly Aromatic Hydrocarbon | C |
| Picco 6110 | Highly Aromatic Hydrocarbon | C |
| Picco 6140 | Highly Aromatic Hydrocarbon | C |
| Piccofyn 135 | Terpene Phenolic | C |
| Piccolastic AL | Styrene Polymer | I |
| Piccolastic D-150 | Styrene Polymer | C |
| Piccolyte A-10 | Polymerized Alpha Pinene | I |
| Piccolyte S-10 | Polymerized Beta Pinene | I |
| Piccomer 10 | Aromatic Hydrocarbon | C |
| Piccomaron 450 | Coumarone-Indene | C |
| Piccovar AP-10 | Aromatic Hydrocarbon | C |
| Piccovar AB-165 | Aliphatic Hydrocarbon | C |
| Sta-Tac-100 | Polymerized Mixed Olefins | C |
| Staybelite | Hydrogenated Rosin | C |
| Stabelite Ester 10 | Hydrogenated Rosin Ester | C |
| **Super Beckacite 2000 | Terpene Phenolic | C |
| TPO-1 | Hydrocarbon | C |
| TPO-2 | Hydrocarbon | C |
| **Varcum 2217 | Phenolic | C |
| Wingtack 10 | Polyterpene | I |

*Can cause crosslinking on heating to ca 150° C.
**Can cause crosslinking on mixing at 130+ C.

Inorganic fillers suitable for use in the adhesive and sealant compositions of the present invention should be present in the adhesive in the amount of about 5 parts by wt. to about 200 parts by wt. per 100 parts by wt. of the copolymer of ethylene, methyl acrylate, and at least one carboxylated unsaturated monomer. Suitable inorganic fillers include carbon black, calcium carbonate, titanium dioxide, talcs, clays, mica, alumina and silica. Mixtures of fillers can also be used.

Carbon black can be used as a filler in the compositions of the present invention to increase mechanical strength and hardness and to decrease the raw materials cost, but it can also reduce adhesion. Mineral fillers such as calcium carbonate or talcs can also be added, but because the terpolymer is only partially neutralized, caution must be exercised when incorporating such materials containing metal ions to prevent an excess of ionomeric crosslinking. Thus, certain types of whiting (e.g., Super Multifex) will cause the polymer to become nervy, while others (e.g., Atomite) act as inert fillers. This reactivity can be taken advantage of to increase the degree of ionic crosslinking in a controlled manner if desired by adding up to about 2 parts by weight per 100 parts by weight of the copolymer of ethylene, methyl acrylate, and at least one carboxylated unsaturated monomer of a reactive base or salt such as potassium hydroxide, sodium acetate or sodium carbonate decahydrate. Additives containing monovalent cations are preferred. Addition of white fillers may also induce blowing at 180° C. or above.

Plasticizers suitable for use in the adhesive and sealant compositions of the present invention should be present in the adhesive in an amount of about 10 parts by weight to about 150 parts by weight per 100 parts by weight of the copolymer of ethylene, methyl acrylate, and at least one carboxylated unsaturated monomer. Suitable plasticizers include the chlorinated paraffins, such as "Chlorowax" 40, sold by Diamond Shamrock Corporation, which is a 40% chlorinated paraffin and has a Brookfield viscosity of 32 poises. Polyester plasticizers such as "Harflex" 330, sold by Wallace and Tiernan Inc., a polymeric plasticizer of 1,3-butylene glycol and adipic acid, having a viscosity of 2340 centipoises at 100° F. are also suitable. Preferred plasticizers include tri(2-ethylhexyl) trimellitate; di(2-ethylhexyl) sebacate; "Plastolein" 9772, sold by Emery Industries, which is a polymeric polyester plasticizer with a solidification point of −9° C., a specific gravity 25°/25° C. of 1.04, an acid number of less than 3.0 and a hydroxyl number of about 15; and "Plastolein" 9734, sold by Emery Industries, which is a polymeric polyester plasticizer with a solidification point of 13° C., a specific gravity 25°/25° C. of 1.04, an acid number greater than 3.0 and a hydroxyl number of about 17. The terpolymer used in the compositions of the present invention possesses high oil resistance and is not generally compatible with hydrocarbon oils. However, it is compatible with most other common types of plasticizers, including esters and chlorinated compounds. In general, care should be exercised in using phosphate ester plasticizers because variable results have been obtained when they are used in the compositions of this invention.

Adhesive and sealant compositions intended for certain uses must not contain components which will slowly bleed out and deposit on the substrate surfaces (fogging). The fog resistance of various tackifiers and plasticizers can be readily evaluated by heating them with a sunlamp to 70° C. in a container covered with a refrigerated plate at 15° C. and examining the plate for residues after periods up to one week. Data for fog resistance of common plasticizers and tackifiers are given in Tables 2 and 3 below:

TABLE 2

FOG RESISTANCE OF SOME PLASTICIZERS FOR ETHYLENE/ACRYLIC ESTER IONOMER

| Trade Name | Chemical Name | Fog Resistance[1] |
|---|---|---|
| Benzoflex 9-88SG | Dipropylene Glycol Dibenzoate | E |
| Benzoflex S552 | Pentaerythritol Tetrabenzoate | E |
| Chlorowax 40 | Chlorinated Hydrocarbon | F |
| Chlorowax 70 | Chlorinated Hydrocarbon | F |
| Citroflex A-4 | Acetyltributyl Citrate | F |
| Dibutoxyethyl Phthalate | Dibutoxyethyl Phthalate | P |
| Dioctyl Adipate | Dioctyl Adipate | E |
| Dioctyl Phthalate | Dioctyl Phthalate | P |
| Dioctyl Sebacate | Dioctyl Sebacate | E |
| Flexol 3GH | Triethylene Glycol Di-2-Ethylbutyrate | P |
| Flexol 4GO | Polyethylene Glycol Dioctoate | G |
| Flexol 10-10 | Didecyl Phthalate | E |
| Flexol TOF | Tri-2-Ethylhexyl Phosphate | G |
| Hatcol TOTM | Trioctyl Trimellitate | G |
| Kenplast G | Aromatic Hydrocarbon | P |
| Kenplast LT | Aromatic Hydrocarbon | P |
| Monoplex S-70 | Monomeric Epoxy Ester | P |
| Monoplex S-73 | Monomeric Epoxy Ester | P |
| Monoplex S-75 | Epoxy Ester | P |
| Paraplex G-25 | High Molecular Weight Polyester | F |
| Paraplex G-40 | High Molecular Weight Polyester | G |
| Paraplex G-41 | High Molecular Weight Polyester | P |
| Paraplex G-62 | High Molecular Weight Soybean Oil Epoxide | F |
| Plastolein 9734 | Polyester | E |
| PX-119 | Mixed Isoalkyl Phthalate | E |
| PX-126 | Ditridecyl Phthalate | E |
| PX-220 | Diisodecyl Adipate | E |
| PX-318 | Mixed Normal Alkyl Phthalate | E |
| PX-337 | Triisooctyl Trimellitate | F |
| Santicizer 409 | Dibasic Acid and Glycol Polymeric | P |
| TP-90B | Di(Butoxy-Ethoxy-Ethyl)Formal | P |
| TP-95 | Di(Butoxy-Ethoxy-Ethyl)Adipate | P |
| Tributyl Phosphate | Tributyl Phosphate | P |

TABLE 2-continued

FOG RESISTANCE OF SOME PLASTICIZERS FOR ETHYLENE/ACRYLIC ESTER IONOMER

| Trade Name | Chemical Name | Fog Resistance[1] |
|---|---|---|
| Tricresyl Phosphate | Tricresyl Phosphate | E |
| Uniflex 330 | Polyester | E |

[1] E = Excellent;
G = Good;
F = Fair;
P = Poor

TABLE 3

FOG RESISTANCE OF SOME TACKIFYING RESINS

| Trade Name | Softening Point, °C. | Fog Resistance[1] |
|---|---|---|
| Piccovar AP-10 | 10 | P |
| Piccomer 10 | 10 | P |
| Cumar P-10 | 10 | F |
| Piccovar AP-25 | 32 | P |
| Piccovar AP-33 | 36 | P |
| Piccomer 40 | 37 | P |
| Piccovar L-60 | 58 | P |
| Picco 6070 | 70 | F |
| Piccomer 75 | 76 | P |
| Staybelite Ester 10 | 83 | G |
| Synthe Copal 1204 | 85 | G |
| Amberol ST-140F | 95 | G |
| Piccovar 420 | 100 | F |
| Piccoumaron 450 | 100 | G |
| Picco 6110 | 110 | G |
| Super Beckacite 2000 | 110 | P |
| Picco 6140 | 140 | G |
| Petrorez 140 | 140 | G |
| Petrorez 145 | 145 | G |

[1] G: Good;
F: Fair;
P: Poor

The adhesive and sealant compositions of the present invention may also include various other additives generally used in hot melt adhesive and sealant compositions, such as reinforcing resins and adhesion promoters.

Flow properties, dead load creep resistance and high temperature strength can often be improved by adding small quantities, up to 30 phr and preferably 2 to 25, phr of reinforcing resins. Preferred reinforcing resins include (a) "Emery" 1540 polyamide resin, sold by Emery Industries, which is a dimer acid-based polyamide resin, with a softening point of 105°–115° C., an amine number of 4, an acid number of 4, and a specific gravity 25°/25° C. of 0.98;

(b) "Versamid" 900, sold by General Mills Chemicals, which is a polyamide resin, fatty acid-based, with a softening point of 170°–190° C., and an amine value of 40–50;

(c) "Vitel" 4709A, sold by Goodyear, which is a polyester resin, with a melting point of 130° C., an inherent viscosity of 0.65, a density of 1295 kg/m$^3$, and a carboxyl content eq/10$^6$ g of less than 45;

(d) Styron 666U, sold by Dow Chemical, which is a polystyrene resin of s.g. 1.04, melt flow rate (ASTM D1278) 7.5 g/10 minutes and Vicat softening point 100° C.; and (e) Kraton G 1652, styrene/ethylene block copolymer sold as crumb by Shell Chemical Company; density 910 kg/m$^3$; hardness Shore A 75.

Up to about 2 parts by weight of silane or polymethyl hydrogen siloxane per 100 parts of the terpolymer can be added to impart high resistance to loss of adhesion to glass in hot water soak or highly humid environments without adverse effect on other properties. Involatile silanes such as vinyl tris(2-methoxyethoxy) silane and α-methacryloxypropyl-trimethoxy silane, or polymethyl hydrogen siloxanes such as Dow Corning 1107 Fluid, are suitable. Silanes containing amino- or epoxy-groups should be avoided since they may induce cross-linking.

As mentioned above, the viscosity stability, particularly at high temperatures, of hot melt adhesive and sealant compositions which are based on alkali metal ionomers of random copolymers of ethylene, methyl acrylate and at least one carboxylated unsaturated monomer is significantly improved by including in such compositions 0.05–10 (preferably 0.1–10) phr of ammonium polyphosphate. The amount of ammonium polyphosphate required to significantly improve sealant stability is generally smaller when the polyphosphate is added to the masterbatch, rather than to the sealant composition. As little as 0.05 phr of ammonium polyphosphate will effect a significant stability increase when added to the masterbatch. When added to the sealant composition, a minimum of 0.5 phr of ammonium polyphosphate is suggested A particularly suitable ammonium polyphosphate is "Phos-Chek" P/30 fire retardant, sold by Monsanto Company, which is an ammonium polyphosphate with a phosphorus weight percent of 32, an insolubility in water at 25° C. of 92% (based upon 10 grams slurried in 100 grams of water for one hour), and has a particle size distribution such that 90 weight % will pass through a 325 mesh screen. In addition, suitable ammonium polyphosphates are those described in U.S. Pat. No. 3,562,197, granted Feb. 9, 1971 to Sears and Vandersall. In particular, suitable ammonium polyphosphates include those water-insoluble compounds having a P—O—P linkage and having the general formula

$$H_{(n-m)+2}(NH_4)_m P_n O_{3n+1}$$

wherein n is an integer having an average value greater than 10, m/n has an average value between about 0.7 and about 1.1 and m has a maximum value equal to n+2.

These polymeric polyphosphates can be either straight chain structures or branched chain structures. It should be noted that substantially all of the nitrogen in these polyphosphates is present as the ammoniacal nitrogen and there is substantially no nuclear nitrogen present in the polyphosphates. In addition, when these polyphosphates are characterized as being substantially water-insoluble it is intended to mean that the solubility of a slurry of 10 grams of solids/100 cc. of water at 25° C. for 60 minutes is about 5 grams/100 cc. of water or less.

Starting with the ionomer masterbatch described hereinbefore, the adhesive and sealant compositions of the present invention can be prepared in a Sigma mixer, kneader extruder, or similar equipment. The mixing time is 45–90 minutes at 120°–160° C. depending on the compounding ingredients employed. The most preferred procedure is to melt the tackifying resins in the mixer and add part of the filler, if used. The masterbatch and remaining filler is then gradually added while keeping the viscosity as high as possible to maximize shear by adding only enough plasticizer to allow the mixer to operate. The remaining plasticizer is added towards the end of the mix followed by any other resins used. Silane is preferably added only a few minutes before the mixing is stopped.

If ammonium polyphosphate has not been added in the preparation of the masterbatch, it may be added during preparation of the adhesive or sealant composition. If no additional reactive base is to be added to adjust the degree of ionic crosslinking of the terpolymer, it should be added as early in the mixing process as possible and preferably added to the tackifying resin first placed in the mixer before the addition of the masterbatch. If a reactive base is to be added to adjust the level of crosslinking, the ammonium polyphosphate should be added only after this base has interacted with the terpolymer, but in any case before the addition of a reinforcing resin such as a polyamide.

The following examples identify various specific adhesive and sealant compositions of the present invention and demonstrate the superior viscosity stability of such compositions as compared with compositions without ammonium polyphosphate but which are otherwise equivalent.

EXAMPLE 1

A mixture of 100 parts of a random copolymer containing 42 wt. % ethylene, 54 wt. % methyl acrylate and 4 wt. % ethyl hydrogen maleate (melt index, ca. 10 g per 10 min, ASTM D1238, 190° C., 2160 g weight), 43 parts of FEF carbon black and 1.2 parts of sodium carbonate decahydrate was prepared in a Banbury mixer at a temperature of 150° C. The resulting mixture, Mixture A, was used to prepare two hot-melt adhesive formulations from the following ingredients:

| Ingredients | Parts by Weight | |
|---|---|---|
| | 1-A | 1-B |
| Mixture A | 100 | 100 |
| Highly aromatic hydrocarbon resin, petroleum-based; softening point, R & B, 108–112° C.; density at 25° C., 1060 kg/m³; sold by Hercules, Inc. as "Picco" 6110 resin | 58 | 58 |
| Tri (2-ethylhexyl) trimellitate | 16 | 16 |
| Di(2-ethylhexyl) sebacate | 7 | 7 |
| Ammonium polyphosphate; phosphorus wt. % 32; insolubility in water at 25° C.*, 92%; 90% through 325 mesh; sold by Monsanto Co. as "Phos-Chek" P/30 fire retardant | 2.1 | — |

*Test basis; 10 g slurried in 100 g water for 1 hour

The formulations were prepared by mixing the ingredients in a sigma blade mixer at 150° C. Thermal stabilities of formulations 1-A and 1-B were determined by measuring the increase in viscosity with time at 205° C. in a Brookfield HAT viscometer with a Thermosel attachment. The results are tabulated below:

| Duration of aging, min | Change in viscosity as % of original viscosity | |
|---|---|---|
| | 1-A | 1-B |
| 0 | 0 | 0 |
| 60 | −2 | +18 |
| 125 | −6 | +47 |
| 180 | +6 | +63 |
| 210 | +2 | +63 |

-continued

| Duration of aging, min | Change in viscosity as % of original viscosity | |
|---|---|---|
| | 1-A | 1-B |
| 300 | −4 | +119 |

The results clearly illustrate the excellent melt stability of the formulation of this invention (1-A) as compared with the control (1-B) which does not contain ammonium polyphosphate.

EXAMPLE 2

A mixture of 100 parts of the random copolymer of Example 1, 75 parts of FEF carbon black and 1.4 parts of sodium carbonate decahydrate was prepared in a Banbury mixer at a temperature of 150° C. The resulting mixture, Mixture B, was used to prepare two hot-melt sealant formulations from the following ingredients:

| Ingredients | Parts by weight | |
|---|---|---|
| | 2-A | 2-B |
| Mixture B | 100 | 100 |
| FEF Carbon Black | 17 | 17 |
| Highly aromatic hydrocarbon resin, petroleum-based; softening point, R & B, 140–144° C.; density at 25° C. 1070 kg/m$^3$; sold by Hercules, Inc. as "Picco" 6140 resin | 30 | 30 |
| Dimer acid-based polyamide resin; softening point, 105–115° C.; amine no. 4; acid no. 4; specific gravity 25°/25° C., 0.98; sold by Emery Industries as "Emerez" 1540 polyamide resin | 14 | 14 |
| Tri(2-ethylhexyl)trimellitate | 35 | 35 |
| Di(2-ethylhexyl)sebacate | 12 | 12 |
| Vinyl tris(2-methoxyethoxy)silane | 0.3 | 0.3 |
| Ammonium polyphosphate, same as used in Example 1 | 1.7 | — |

Melt stabilities of formulations 2-A and 2-B were determined at 205° C. using the procedures of Example 1.

| Duration of aging, min | Change in viscosity as % of original viscosity | |
|---|---|---|
| | 2-A | 2-B |
| 0 | 0 | 0 |
| 70 | −13 | +46 |
| 120 | −5 | +85 |
| 155 | +6 | +123 |
| 265 | +32 | +305 |
| 300 | +27 | +363 |

The results clearly show the improved melt stability of Formulation 2-A versus the control 2-B.

EXAMPLE 3

Three hot-melt sealant formulations were prepared by mixing the following ingredients in a sigma-blade mixer at 150° C.

| Ingredients | Parts by Weight | | |
|---|---|---|---|
| | 3-A | 3-B | 3-C |
| Mixture B of Example 2 | 100 | 100 | 100 |
| Highly aromatic hydrocarbon resin of Example 1 | 40 | 40 | 40 |
| Polyamide resin, fatty acid based; softening point, 170–190° C.; amine value, 40–50; sold by General Mills Chemicals, Inc. as "Versamid" 900 | 30 | 30 | 30 |
| Polymeric polyester plasticizer; solidification point, −9° C.; specific gravity, 25°/25° C., 1.04; acid no., <3.0; hydroxyl no., ~15; sold by Emery Industries, Inc. as "Plastolein" 9772. | 30 | 30 | 30 |
| Vinyl tris(2-methoxyethoxy)silane | 0.3 | 0.3 | 0.3 |
| Sodium carbonate decahydrate | — | 0.6 | — |
| Ammonium polyphosphate, same as used in Example 1 | 1.7 | 1.7 | — |

Melt stabilities at 205° C. of formulations 3-A, 3-B, and 3-C were determined by viscosity measurements made by the procedure of Example 1.

| Duration of aging, min | Change in Viscosity as % of original viscosity | | |
|---|---|---|---|
| | 3-A | 3-B | 3-C |
| 0 | 0 | 0 | 0 |
| 30 | −14 | 0 | +5 |
| 40 | +5 | −5 | +14 |
| 70 | +2 | −12 | +57 |
| 110 | +17 | −19 | +121 |
| 160 | +38 | −16 | +202 |
| 175 | +36 | −12 | +224 |

The improvement in melt stability of the formulations of this invention (3-A and 3-B) is again clearly evident in comparison with the control, 3-C.

EXAMPLE 4

Two hot-melt sealant formulations were prepared by mixing the following ingredients in a sigma-blade mixer at 150° C.

| Ingredients | Parts by Weight | |
|---|---|---|
| | 4-A | 4-B |
| Mixture A of Example 1 | 100 | 100 |
| Highly aromatic hydrocarbon resin of Example 1 | 40 | 40 |
| Polyester resin; mp 130° C.; inherent viscosity, 0.65; density, 1295 kg/m$^3$; carboxyl content, eq/10$^6$ g, <45; sold by Goodyear as "Vitel" 4709A | 30 | 30 |
| Tri(2-ethylhexyl)trimellitate | 30 | 30 |
| Ammonium polyphosphate, same as used in Example 1 | 2.1 | — |

Melt stability of the formulations was determined by viscosity measurements at 205° C. using the procedure of Example 1. The results are tabulated below.

| Duration of aging, min | Change in viscosity as % of original viscosity | |
|---|---|---|
| | 4-A | 4-B |
| 0 | 0 | 0 |
| 25 | +2 | +14 |
| 55 | −9 | +27 |
| 120 | −18 | +71 |
| 215 | −9 | >+130 |
| 300 | −2 | >+134 |

The superior stability of the formulation of this invention, 4-A, is evident.

EXAMPLE 5

A series of hot-melt sealants was prepared in which the only variable is the concentration of ammonium polyphosphate. The basic formulation for these sealants was as follows.

| Ingredient | Parts by Weight |
|---|---|
| Mixture A of Example 1 | 100 |
| Polyamide resin of Example 3 | 30 |
| Highly aromatic hydrocarbon resin of Example 2 | 40 |
| Polymeric polyester plasticizer; solidification point, 13° C.; specific gravity, 25°/25° C., 1.04, acid no. >3.0; hydroxyl no. ~17; sold by Emery Industries, Inc. as "Plastolein" 9734 | 30 |
| Sodium carbonate decahydrate | 0.6 |
| Vinyl tris(2-methoxyethoxy)silane | 0.6 |
| Ammonium polyphosphate, same as used in Example 1 | —* |

*Amounts used as shown in the following table

Melt stability of the formulations was determined by viscosity measurements at 205° C. using the procedure of Example 1. The results are tabulated below:

| | Change in Viscosity as % of original viscosity Ammonium polyphosphate, parts/100 parts of random copolymer | | | | | |
|---|---|---|---|---|---|---|
| Duration of aging, min | 0 | 1.0 | 2.0 | 3.0 | 5.0 | 8.0 |
| 0 | 0 | 0 | 0 | 0 | 0 | 0 |
| 20 | −3 | +2 | +10 | −26 | −8 | −11 |
| 30 | −1 | −4 | 0 | +33 | −24 | −6 |
| 40 | +9 | +6 | −27 | +2 | +17 | −6 |
| 60 | +18 | +11 | −12 | +9 | −10 | −6 |
| 75 | +30 | 0 | −14 | +15 | −6 | −1 |
| 95 | +46 | +13 | −14 | +24 | +1 | +17 |
| 115 | +79 | +16 | −16 | +32 | +8 | +35 |
| 130 | +110 | +18 | −15 | +39 | +14 | +52 |
| 145 | +140 | +20 | −20 | +45 | +20 | +66 |
| 200 | +235 | +28 | −4 | +68 | +50 | +120 |

The results demonstrate significant improvements in melt stability in the presence of ammonium polyphosphate, particularly at levels of about 1 to 5 parts/100 parts of random copolymer.

EXAMPLE 6

A mixture of 100 parts by weight of a random copolymer containing 45% by weight ethylene, 52% methyl acrylate and about 3% methacrylic acid having a melt index of about 7 (ASTM D1238, 190° C., 2160 g weight) was mixed on a rubber mill with 43 parts by weight FEF carbon black and 1.2 parts sodium carbonate decahydrate at 90°–100° C. for 5 minutes. The resulting mixture, Mixture C, was used to prepare two hot-melt sealant formulations from the following ingredients:

| | Parts by Weight | |
|---|---|---|
| Ingredients | 6A | 6B |
| Mixture C | 100 | 100 |
| Highly aromatic hydrocarbon resin of Example 2 | 36 | 36 |
| Polyamide resin of Example 3 | 18 | 18 |
| Polymeric polyester plasticizer of Example 5 | 27 | 27 |
| Vinyl tris(2-methoxyethoxy)silane | 0.5 | 0.5 |
| Ammonium polyphosphate, same as used in Example 1 | — | 2.1 |

The melt stabilities of the formulations were determined by viscosity measurements at 205° C. using the procedure of Example 1. The results are tabulated below:

| | Change in Viscosity as % of Original Viscosity | |
|---|---|---|
| Duration of Aging, min. | 6A | 6B |
| 0 | 0 | 0 |
| 10 | +39 | 0 |
| 20 | +104 | −13 |
| 30 | +450 | −13 |
| 40 | +860 | −7 |

The improvement in melt stability of the formulation 6B of this present invention is clearly evident in comparison with the control 6A.

EXAMPLE 7

Mixture A of Example 1 was employed to prepare hot-melt sealant formulations from the following ingredients:

| | 7-A | 7-B | 7-C | 7-D |
|---|---|---|---|---|
| Mixture A of Example 1 | 100 | 100 | 100 | 100 |
| Highly aromatic hydrocarbon resin of Ex. 2 | 23.7 | 23.7 | 21.5 | 21.5 |
| Refined natural fossil hydrocarbon resin, softening point, R and B, 180° C.; density at 25° C., 1020 kg/m³; sold by Hercules Inc. as Blackhawk 500 Resin | 23.2 | 23.2 | 23.2 | 23.2 |
| Polystyrene resin sold by Dow Chemical as Styron 666 U | 5.1 | 5.1 | — | — |
| Styrene/ethylene block copolymer sold by Shell Chemical Company as Kraton G 1652; density, 910 kg/m³; hardness Shore A, 75 | — | — | 5.1 | 5.1 |
| Tri(2-ethylhexyl) trimellitate | 24.7 | 24.7 | — | — |
| Polyester plasticizer of dibasic acid and glycol, s.g. 1.080–1.084, sold by Monsanto as Santicizer 409 | — | — | 12.6 | 12.6 |
| Tricresyl phosphate | — | — | 12.6 | 12.6 |
| Highly delaminated pure phlogopite mica flake, size 92% passing 325 mesh, bulk density 144–208 kg/m³, sold by Marietta Resources International Inc. as Suzorite Mica 325 HK | 5.1 | 5.1 | 5.1 | 5.1 |
| Vinyl tris(2-methoxyethoxy) silane | 0.5 | 0.5 | 0.5 | 0.5 |
| Ammonium polyphosphate, same as used in Example 1 | — | 1.4 | — | 1.4 |

Mixing was carried out by heating the Sigma blade mixer to 150°–180° C. and adding the Picco 6140 and Blackhawk 500 resins to it with the blades stopped. The ammonium polyphosphate, if used, and about a tenth of the total amount of plasticizer was next added and the mixer turned on to partially soften the resins. The Mixture A was then added and mixed for about 15 minutes until the entire mass was uniform. The Suzorite mica and Styron 666 U or Kraton G 1652 were then added and mixed for about 10 minutes, after which the remainder of the plasticizer was added. Mixing was then continued to give a total mixing time of 45-60 minutes to produce a smooth, uniform mass of the sealant. The vinyl tris(2-methoxyethoxy) silane was added about 5-10 minutes before mixing was completed.

The thermal stabilities of these formulations were determined by viscosity measurements at 205° C. using the procedure of Example 1. The results are tabulated below.

| Duration of Aging, min. | Change in Viscosity as % of Original Viscosity | | | |
|---|---|---|---|---|
| | 7-A | 7-B | 7-C | 7-D |
| 0 | 0 | 0 | 0 | 0 |
| 10 | −15 | 0 | +5 | −12 |
| 50 | +24 | −14 | +28 | −40 |
| 100 | +35 | 0 | +48 | −12 |
| 160 | +37 | −11 | +72 | −29 |
| 230 | +67 | −9 | +100 | +18 |
| 325 | +58 | −14 | +137 | +16 |

The data clearly demonstrate the improved melt stabilities of the formulations of this present invention (7-B and 7-D) compared with the controls (7-A and 7-C).

EXAMPLE 8

Mixtures 8-A, 8-B and 8-C were prepared in an internal mixer by the procedure used for Mixture A in Example 1. The random copolymer contained 40.6 wt % ethylene, 55.2 wt % methyl acrylate and 4.2 wt % ethyl hydrogen maleate (melt index, 9.1 g per 10 min, ASTM D1238, 190° C., 2160 g weight). The copolymer, carbon black and sodium carbonate were mixed for about 3 minutes and then ammonium polyphosphate was added to Mixtures 8-B and 8-C in the amounts shown below and mixing was continued for an additional 1-2 minutes.

| Ingredients | Parts by Weight | | |
|---|---|---|---|
| | 8-A | 8-B | 8-C |
| Random copolymer | 100 | 100 | 100 |
| FEF Carbon black | 43 | 43 | 43 |
| Sodium carbonate decahydrate | 1.2 | 1.2 | 1.2 |
| Ammonium polyphosphate of Example 1 | — | 0.2 | 0.5 |

Hot-melt sealant formulations were then prepared from the above masterbatches (Mixtures 8-A, B, C) by the mixing procedure of Example 7. The formulations employed were as follows, based on 100 parts of the above masterbatches.

| Ingredients | Parts by Weight | | | |
|---|---|---|---|---|
| | 8-D | 8-E | 8-F | 8-G |
| Mixture 8-A | 100 | — | — | 100 |
| Mixture 8-B | — | 100 | — | — |
| Mixture 8-C | — | — | 100 | — |
| Highly aromatic hydrocarbon of Example 2 | 23.7 | 23.7 | 23.7 | 23.7 |
| Refined natural fossil hydrocarbon resin of Example 7 | 23.2 | 23.2 | 23.2 | 23.2 |
| Styrene/ethylene block copolymer of Example 7 | 5.1 | 5.1 | 5.1 | 5.1 |
| Tri(2-ethylhexyl) trimellitate | 24.7 | 24.7 | 24.7 | 24.7 |
| Highly delaminated pure phlogopite mica flake of Example 7 | 5.1 | 5.1 | 5.1 | 5.1 |
| Vinyl tris(2-methoxyethoxy)-silane | 0.5 | 0.5 | 0.5 | 0.5 |
| Ammonium polyphosphate of Example 1 | — | — | — | 1.4 |

The thermal stabilities of these formulations were determined by viscosity measurements at 205° C. using the procedure of Example 1. The results are tabulated below.

| Duration of Aging (minutes) | Change in Viscosity as % of Original Viscosity | | | |
|---|---|---|---|---|
| | 8-D | 8-E | 8-F | 8-G |
| 0 | 0 | 0 | 0 | 0 |
| 10 | +190 | +29 | 0 | +45 |
| 20 | +380 | +73 | +4 | +45 |
| 40 | — | +94 | +4 | +42 |
| 60 | — | +113 | −3 | +31 |
| 90 | — | +130 | −7 | +14 |
| 120 | — | +136 | −7 | +9 |
| 180 | — | +144 | −8 | +8 |
| 240 | — | +153 | −39 | −5 |
| 300 | — | +161 | −39 | 0 |

These data clearly illustrate the improved melt stabilities of the formulations of this present invention 8E, 8F and 8G compared to the control 8D. They also demonstrate that the addition of 0.5 phr of ammonium polyphosphate to the masterbatch in 8F is at least as effective in preventing increase in melt viscosity as the addition of 2.0 phr of ammonium polyphosphate to the sealant in 8G.

INDUSTRIAL APPLICABILITY

The adhesive and sealant compositions of the present invention are particularly well suited for use as hot melt compositions. In addition, these compositions can be extruded into tapes suitable for cold manual application. These compositions can be used, for example, as sealants for double glazing units to be used as windows, as adhesives for automobile windows, as architectural glass sealants, as sealants in solar collectors, as load bearing sealants for automotive, appliance and aerospace applications, or as jet apron sealants. These compositions can be used as adhesives for a variety of substrates including glass, aluminum, steel, copper, zinc, brass, polycarbonate, polyvinyl chloride, and fiber reinforced plastics.

BEST MODE

Although the best mode of the present invention, i.e., the single most preferred adhesive and sealant composition of the present invention, will depend on the particular desired end use and the specific requisite combination of properties for that use, the single most preferred composition for the widest variety of possible end uses will generally conform to the composition described in Example 7B.

We claim:

1. Masterbatch compositions suitable for preparing adhesive and sealant compositions, said masterbatch compositions consisting essentially of an alkali metal ionomer of a random copolymer of ethylene, methyl acrylate, and at least one carboxylated termonomer of the general formula

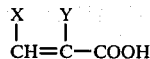

where X is H or COOR or COOH,
where Y is H or Me, and
where R is alkyl of 1-6 carbon atoms, an inorganic filler, and 0.05-10 phr of an ammonium polyphosphate having the general formula $$H_{(n-m)+2}(NH_4)_m P_n O_{3n+1}$$

wherein n is an integer having a number average value greater than 10, m/n has an average value between about 0.7 and about 1.1, and m has a maximum value equal to n+2.

2. A masterbatch composition of claim 1 wherein the alkali metal is selected from the group consisting of sodium and potassium.

3. A masterbatch composition of claim 1 wherein the inorganic filler is carbon black.

4. A masterbatch composition of claim 1 wherein the terpolymer contains about 50-60 weight % polymerized methyl acrylate units, about 3 to 5 weight % polymerized monoethyl maleate units, and about 35-47 weight % polymerized units of ethylene, and further wherein about 5-50 weight % of the monoethyl maleate units have been neutralized with an alkali metal.

5. Adhesive and sealant compositions comprising an alkali metal ionomer of a random copolymer of ethylene, methyl acrylate, and at least one carboxylated termonomer of the general formula

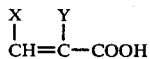

where X is H or COOR or COOH,
Y is H or Me, and
R is alkyl of 1-6 carbon atoms, an inorganic filler, 0.05-10 phr of an ammonium polyphosphate having the general formula $$H_{(n-m)+2}(NH_4)_m P_n O_{3n+1}$$

wherein n is an integer having a number average value greater than 10, m/n has an average value between about 0.7 and about 1.1, and m has a maximum value equal to n+2, a tackifier and a plasticizer.

6. An adhesive and sealant composition of claim 5 further comprising a reinforcing resin and an adhesion promoter.

7. An adhesive and sealant composition of claim 5 wherein the tackifier comprises about 0-250 parts by weight per 100 parts by weight of the terpolymer, the plasticizer comprises about 10-150 parts by weight per 100 parts by weight of the terpolymer, and the filler comprises about 5-200 parts by weight per 100 parts by weight of the terpolymer.

8. An adhesive and sealant composition of claim 6 wherein the reinforcing resin comprises up to about 30 parts by weight per 100 parts by weight of the termpolymer, and the adhesion promoter comprises 0.2 to 2 parts by weight per 100 parts by weight of the terpolymer.

9. A process for stabilizing the viscosity of an adhesive and sealant composition based on an alkali metal ionomer of a random copolymer of ethylene, methyl acrylate, and at least one carboxylated unsaturated monomer of the general formula

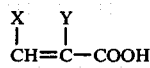

where X is H or COOR or COOH,
where Y is H or Me, and
where R is alkyl of 1-6 carbon atoms, said process comprising adding to and blending with said composition 0.05-10 phr of an ammonium polyphosphate having the general formula $$H_{(n-m)+2}(NH_4)_m P_n O_{3n+1}$$

wherein n is an integer having a number average value greater than 10, m/n has an average value between about 0.7 and about 1.1, and m has a maximum value equal to n+2.

* * * * *